(12) United States Patent
Hartmann

(10) Patent No.: US 8,210,784 B2
(45) Date of Patent: Jul. 3, 2012

(54) FASTENER ASSEMBLY INCLUDING A SCREW AND A CAPTIVELY ARRANGED BUSH

(75) Inventor: Gunther Hartmann, Alsfeld (DE)

(73) Assignee: KAMAX-Werke Rudolf Kellermann GmbH & Co. KG, Osterode am Harz (DE)

( * ) Notice: Subject to any disclaimer, the term of this patent is extended or adjusted under 35 U.S.C. 154(b) by 422 days.

(21) Appl. No.: 12/482,754

(22) Filed: Jun. 11, 2009

(65) Prior Publication Data

US 2009/0317207 A1   Dec. 24, 2009

(30) Foreign Application Priority Data

Jun. 19, 2008   (DE) .......................... 10 2008 029 236

(51) Int. Cl.
*F16B 21/18* (2006.01)
(52) U.S. Cl. ............. 411/353; 411/360; 411/383; 470/2
(58) Field of Classification Search .................. 411/24, 411/60.1, 65, 80.5, 80.6, 265, 266, 267, 277, 411/278, 352, 353, 360, 361, 383, 435–438, 411/517, 525–529, 551, 970, 999; 24/289–293, 24/458; 29/525.11, 525.13; 470/2, 6, 48
See application file for complete search history.

(56) References Cited

U.S. PATENT DOCUMENTS

| | | | | |
|---|---|---|---|---|
| 1,328,488 A | * | 1/1920 | Bowden | ........................ 138/89.4 |
| 2,972,367 A | * | 2/1961 | Wootton | ........................ 411/350 |
| 3,323,404 A | * | 6/1967 | Fischer | ........................ 411/80.5 |
| 3,525,285 A | * | 8/1970 | Van Niel et al. | ................. 411/49 |
| 4,311,422 A | * | 1/1982 | Jackovitz | ...................... 411/112 |

(Continued)

FOREIGN PATENT DOCUMENTS

DE   199 24 502 A1   12/2000

(Continued)

*Primary Examiner* — Victor Batson
*Assistant Examiner* — Roberta Delisle
(74) *Attorney, Agent, or Firm* — Thomas, Kayden, Horstemeyer & Risley, LLP

(57) ABSTRACT

A fastener assembly (1) includes a screw (2) and a bush (3). The screw (2) includes a head (4), a shank portion (6) and a threaded portion (7) including a thread (8). The shank portion (6) is arranged to face the head (4) and the threaded portion (7) is arranged to face away from the head (4). The shank portion (6) has a diameter and the thread (8) has an outer diameter, the diameter of the shank portion (6) being smaller than the outer diameter of the thread (8). The bush (3) includes a first narrowing location (10) having a diameter being smaller than the outer diameter of the thread (8). The bush (3) is captively connected to the screw (2) by the first narrowing location (10). The bush (3) includes at least one resilient element (15) having an actuation portion (28) and an engagement portion (29). The actuation portion (28) in an unmounted position of the fastener assembly (1) extends from the outer circumference of the bush (3) in a radial direction in a way that the engagement portion (28) does not engage the thread (8) of the threaded portion (7). The actuation portion (28) is designed and arranged to be pressed in an inward direction in a pre-mounted position of the fastener assembly (1) in a bore (22) of a component (20) such that the engagement portion (29) engages the thread (8) of the threaded portion (7).

15 Claims, 14 Drawing Sheets

U.S. PATENT DOCUMENTS

| | | | |
|---|---|---|---|
| 4,435,111 A * | 3/1984 | Mizusawa | 411/437 |
| 5,489,177 A | 2/1996 | Schmidt, Jr. | |
| 6,227,783 B1 * | 5/2001 | Salameh | 411/353 |
| 6,309,157 B1 | 10/2001 | Amann et al. | |
| 6,585,468 B2 * | 7/2003 | Johnson et al. | 411/353 |
| 6,685,409 B2 | 2/2004 | Braun et al. | |
| 2002/0098058 A1 * | 7/2002 | Caldera | 411/353 |
| 2003/0194292 A1 | 10/2003 | Deeg et al. | |
| 2003/0194293 A1 * | 10/2003 | Johnson et al. | 411/353 |

FOREIGN PATENT DOCUMENTS

| | | |
|---|---|---|
| DE | 102 15 883 A1 | 10/2003 |
| DE | 10 2005 002 603 A1 | 10/2005 |
| EP | 1 055 829 B1 | 1/2007 |

* cited by examiner

FASTENER ASSEMBLY INCLUDING A SCREW AND A CAPTIVELY ARRANGED BUSH

CROSS REFERENCE TO RELATED APPLICATIONS

This application claims priority to co-pending German Patent Application No. DE 10 2008 029 236.2 entitled "Verbindungselement mit einer Schraube und einer daran unverlierbar angeordneten Hülse", filed Jun. 19, 2008.

FIELD OF THE INVENTION

The present invention generally relates to a fastener assembly including a screw and a bush. More particularly, the present invention relates to a fastener assembly in which the bush is captively connected to the screw by a narrowing location.

BACKGROUND OF THE INVENTION

A fastener assembly is known from German Patent Application No. DE 102 15 883 A1 corresponding to US Patent Application No. US 2003/0194292 A1. The known fastener assembly includes a screw and a bush being captively connected to the screw. The bush is designed as a form body having a cylindrical wall which is closed in a circumferential direction, and it includes at least one flange extending outwardly in a radial direction. The screw includes a head and a shank. A threaded portion is located on the shank in a region facing away from the head, and a shank portion is located on the shank in a region facing the head. The shank portion has an outer diameter which is smaller than the outer diameter of the threaded portion. The bush includes a narrowing location having a smaller diameter than the outer diameter of the threaded portion. The narrowing location cooperates with the end portion of the threaded portion facing the head in a way to form an undercut. The undercut forms a rigid non-resilient stop. The narrowing location may be formed by a plurality of impressions which are produced after rolling the thread of the threaded portion and after having inserted the screw into the bush.

Another fastener assembly is known from German Patent Application No. DE 199 24 502 A1 corresponding to European Patent No. EP 1 055 829 and U.S. Pat. No. 6,309,157 B1. The known fastener assembly includes a screw including a head with a supporting surface and a shank. The shank includes a cylindrical shank portion and a threaded portion including a thread. The shank portion is arranged to face the head and the supporting surface of the head of the screw, respectively. The threaded portion is more or less located at the free end of the shank of the screw. The fastener assembly further includes a bush. The bush may be designed to include a slot. The fastener assembly is obtained by connecting the screw to the bush. The screw is captively arranged at the bush by a narrowing location, and it is movable in an axial direction within certain limits. The narrowing location has a smaller diameter than the outer diameter of the threaded portion. The shank portion has a comparatively small diameter, meaning a diameter which is smaller than the diameter of the thread.

A fastener assembly including a screw and a bush with a flange, the bush being captively connected to the screw, are known from U.S. Pat. No. 5,489,177. The screw and the bush are separately produced in the sense of finishing, and they are axially interconnected afterwards. When connecting them, the bush in the region of its narrowing location is mostly resiliently expanded such that it reattains a comparatively smaller diameter after having snapped over a protrusion located at the shank of the screw. In other words, the screw is designed as a special screw including a protrusion in the region between the threaded portion and the shank portion having a reduced cylindrical shape. Conventional screws including a normal shank and a normal threaded portion cannot be used in this known fastener assembly.

A fastener assembly including a screw and a bush being captively connected to the screw are known from German Patent Application No. DE 10 2005 002 603 A1. The bush is designed as a form body having a cylindrical wall being closed in a circumferential direction, and it includes at least one flange extending outwardly in a radial direction. The screw is designed as a special screw including a radially extending continuous protrusion in addition to a shank portion and a threaded portion. The protrusion is arranged in the region of the shank portion having a reduced diameter. The bush includes two narrowing locations being associated with the protrusion, the narrowing locations being spaced apart in an axial direction and cooperating with the protrusion. In this way, the screw and the bush are captively interconnected. One of the narrowing locations is axially aligned before pushing the bush over the special screw and to be radially deformable after having pushed the bush over the screw. The other narrowing location is designed to be resilient such that the cylindrical bush can be pushed over the threaded portion.

Another fastener assembly including a screw and a bush is known from U.S. Pat. No. 6,685,409 B2. The known fastener assembly includes a screw and a bush being captively connected to the screw. The bush is designed as a form body having a cylindrical wall which is closed in a circumferential direction, and it includes at least one flange extending outwardly in a radial direction. The screw includes a head and a shank. A threaded portion is located on the shank in a region facing away from the head, and a shank portion is located on the shank in a region facing the head. The shank portion has an outer diameter which is smaller than the outer diameter of the threaded portion. The bush includes a narrowing location having a smaller diameter than the outer diameter of the threaded portion. The narrowing location cooperates with the end portion of the threaded portion facing the head in a way to form an undercut. The undercut forms a rigid non-resilient stop. The narrowing location may be formed by a plurality of impressions which are produced after rolling the thread of the threaded portion and after having inserted the screw into the bush.

SUMMARY OF THE INVENTION

The present invention relates to a fastener assembly including a screw and a bush. The screw includes a head, a shank portion and a threaded portion including a thread. The shank portion is arranged to face the head and the threaded portion is arranged to face away from the head. In other words, the shank portion is arranged close to the head and between the head and the threaded portion. The shank portion has a diameter and the thread has an outer diameter, the diameter of the shank portion being smaller than the outer diameter of the thread. The bush includes a first narrowing location having a diameter being smaller than the outer diameter of the thread. The bush is captively connected to the screw by the first narrowing location. The bush furthermore includes a resilient element having an actuation portion and an engagement portion. In an unmounted position of the fastener assembly, the actuation portion protrudes out off the outer circumference of the bush such that the engagement portion does not engage the thread of the threaded portion. In a pre-mounted position of the fastener assembly in a bore of a component, the actuation portion is pressed in an inward direction such that the engagement portion engages the thread of the threaded portion.

The present invention also relates to pre-mounted unit including a component including a bore and at least one fastener assembly as described above. The fastener assembly is fixedly arranged in the bore of the component.

The present invention also relates to a method of producing a fastener assembly as described above.

With the novel fastener assembly, the novel pre-mounted unit and the novel method of manufacturing the fastener assembly, it is possible to permanently connect the screw and the bush in a captive way and such that the screw—apart from the captive arrangement—in the unmounted position is freely movable with respect to the bush in an axial direction while it is not movable in an axial direction in the pre-mounted position of the bush in a bore of a component.

The term "fastener assembly" as used in the present application is always to be understood as designating a screw and a bush being connected to form an assembly. It could also be called a "connecting unit" or a "connecting element". The bush could also be called "bushing", "casing", "sleeve" or "cylindrical tube". Such fastener assemblies are especially transported from the screw manufacturer to another manufacturer for further assembly. This manufacturer especially mounts a plurality of the fastener assemblies to a component or part, especially a cover, a hood, and the like, to attain a pre-mounted unit. The pre-mounted unit includes a component and at least one mounted fastener assembly, usually a plurality of mounted fastener assemblies. The pre-mounted unit is then further transported, for example to an automobile manufacturer. The pre-mounted unit is then connected to another component in a production line of the manufacturer. Especially, the other component may be a lower part, such as a cylinder block, a transmission case and the like. During this final assembly, the screws of the fastener assemblies of the pre-mounted unit are introduced into bores being located in the associated other component. Especially, they are screwed into threaded bores being located in the other component.

It has been found out that it is desirable in certain applications of the fastener assembly that the screw is positioned in the bush such that the screw with its free end facing away from the head does not protrude out off the bush. For example, such an application is a pre-mounted unit in which the bush has been pressed into a bore of a first component. This pre-mounted unit is to be connected to a second component during final assembly, especially by a plurality of fastener assemblies. Due to the novel defined position of the screw with respect to the bush resulting from contact of the screw to the second narrowing location of the bush, it is possible to freely move and position, respectively, the pre-mounted unit over the second component. Any damages of the assembly surface of the second component caused by the free ends of the screws are prevented in a reliable way.

At the same time, it has been found that it may be desirable that the screw—with the exception of the captive arrangement by the first narrowing location—in the unmounted position of the fastener assembly, meaning in a position in which the bush is not located in a bore of a component, is freely movable with respect to the bush in an axial direction. In this way, the bush may take a freely choosable position with respect to the screw, especially a position in which the bush with its respective end at the head supporting surface contacts the head of the screw. In this position, the bush is pressed into the respective bore of the component. To attain the above described other position in which the head of the screw comes clear from the bush—or in other words the remote free end of the screw enters the bush—the screw is pulled away from the bush and the component and the screw is pressed into the bush, respectively.

In the pre-mounted position of the fastener assembly in which the bush is located in a bore of a component by a press-fit, the novel fastener assembly includes two narrowing locations at the bush. Preferably, one of the narrowing locations is designed to be non-resilient, while the other narrowing location is designed to be resilient. Both narrowing locations cooperate with the threaded portion being located at the screw, and they are coordinated with the threaded portion in a special way.

The first narrowing location together with the end portion of the threaded portion facing the head of the screw forms a pair of stops in the sense of a stop and a counter stop. The pair of stops ensures the captive and captivated, respectively, arrangement, it is effective in this direction, and it cannot be overcome by forces usually occurring.

The second narrowing location is designed to be elastic and resilient, the free ends of the resilient elements of the narrowing location passing by the tips of the thread of the threaded portion in the sense of a ratchet. This at least applies in the direction when the screw is partly pulled or pushed out off the bush. This outwardly directed movement is limited by contact of the pair of stops of the first narrowing location. In this way, the limited axial movability known from the prior art is eliminated or at least further reduced. In the other direction, meaning when further pushing the screw into the bush, such a movement may either be allowed or prevented depending on the design of the free ends of the resilient elements. In case the free ends are designed similar to barbs, this movement is prevented such that during final assembly the screw can only be moved out off the bush by a rotational movement in an advantageous way.

The two narrowing locations serve to secure the relative position between the screw and the bush in different directions. The first narrowing location forms a stop in the sense of a captive arrangement, and it prevents the screw from exiting the bush in an upward direction and the bush from dropping down beyond the free end of the screw facing away from the head, respectively. The second narrowing location is not active until the bush is located in its pre-mounted position in a bore. The second narrowing location serves to attain and maintain a defined position of the screw with respect to the bush. In other word, it prevents an undesired relative movement of the screw into the bush. The screw automatically remains in its position in which it maximally extends from the bush. This function of the resilient element is not yet activated in the free (unmounted) position of the bush such that the screw and the bush—apart from the captive arrangement—can be freely positioned with respect to one another. The possibility of free positioning is especially desired for the process of pressing the bush into a bore of a component during pre-assembly.

The bush of the fastener assembly includes at least one resilient element, especially a resilient element being elastic and resilient, respectively, in a radial direction. It is possible to arrange a plurality of resilient elements, especially two, three, four or more elements. An embodiment using two resilient elements is preferred. Preferably, the two resilient elements are located at opposite positions (meaning at 180°) at the circumference of the bush.

The design of the resilient element with respect to its deformation properties may be chosen in different ways. A first possibility is to design the resilient element such that it is only subjected to an elastic deformation when the bush is pressed into the bore and the actuation portion of the resilient element is contacted by the wall of the bore. However, it is also possible that an elastic and plastic deformation is realized.

It is especially preferred to use normal screws in contrast to screws having a special design for realizing the captive arrangement. The screws include a head, a shank portion and a threaded portion and usually a centering portion being located at the free end. Both narrowing locations of the bush cooperate with portions of the threaded portion, especially with such portions of the threaded portion facing the head of the screw. The first narrowing location may be arranged to engage in the portion of the thread runout of the threaded portion facing the head of the screw. It may also be advantageous to arrange the second narrowing location such that it contacts a portion of the threaded portion being located close to the head of the screw.

The second narrowing location is designed to be resilient, and for this purpose it includes one or more elastic elements being designed to be elastically deformable in a radial direction. Usually, the second narrowing location includes a plurality of such elements the free ends of which engaging the outer thread of the threaded portion more or less in a radial direction or in an inclined direction especially in the sense of a frictional connection and/or a positive fit. This engagement may be especially determined by the design of the force of the spring with which the resilient elements engage the threads of the threaded portion.

Another influencing variable is the design of the free ends of the resilient elements. For example, the free ends may be designed to be sharp-edged, for example complementary to the design of the threads of the threaded portion. However, for example, the free ends of the resilient elements may also be designed to be rounded. Such a rounded shape reduces damages of the threads of the threaded portion during axial movement occurring between the screw and the bush. A sharp-edged design of the free ends of the resilient elements in connection with a great force of the spring, meaning an especially stiff design of the resilient elements, may be used to prevent the screw being further pushed through the bush by a pure axial force during final assembly. Instead, the screw can only be moved in a direction to exit the bush by a rotational movement. For example, the screw may then enter a respective bore of the associated other component. Depending on the design, it is also possible to make use of a compromise in which a limited axial force acting on the screw during final assembly is sufficient to introduce the screw into the bore, especially a threaded bore, of the associated other component without damaging the beginning of the threads of the threaded bore in the other component by the screw. It is also possible that the second narrowing location with its resilient elements forms barbs for the end of the thread facing the head, the barbs facing in a rear direction. The resilient elements may also be designed as elastic tongues. The resilient element may also be designed in a way that its free end is broadened. In this way, the supporting effect of the resilient element is improved and the relative position of the bush with respect to the screw is secured in a reliable way.

The bush of the novel fastener assembly preferably includes a separation element being designed to be continuous in an axial direction. The term "separation element" as used herein is to be understood as both covering a slot and a gap being located on the surface line of the bush and being directed in an axial direction or inclined in a continuous way. A "slot" is to be understood as an interruption of the material of the bush in a circumferential direction, the separate ends of the strip of material resulting form the interruption being arranged more ore less close to one another, meaning with no or at least no substantial distance. Such a design only allows for substantial radial movement of the separate ends of the bush in a radial outward direction. A "gap" is to be understood as an interruption of the material of the bush in the same direction, but the ends of the material of the bush having a substantial distance between them. In case the bush includes a gap, the ends of the material can be moved in a radial direction with respect to one another in both directions, meaning in a radial outward direction and in a radial inward direction. This property can be used to compensate tolerances of the diameters of the bores in the component to be mounted. For example, if the component to be mounted is a hood, it may especially be made of plastic such that the bores in addition to different diameters due to tolerances also include draft angles. All this and more may be compensated by the resilient properties of the bush.

No matter if the bush of the fastener assembly includes a slot or a gap, manufacture of the bush for the fastener assembly is comparatively easy. The bush may be formed as a plain strip of sheet metal, especially made of metal, especially by punching and stamping. The elements of the two narrowing locations may already be formed during this process. The elements may be formed into the strip of material in its plain shape by using counter supports such that the narrowing locations can be produced within comparatively small tolerances. In the following, the prepared strip of material and section of material, respectively, is rolled to attain the shape of a raw bush. This raw bush is characterized by the two ends of the strip of material facing each other still having a greater distance than the finished bush of the fastener assembly. In other words, the raw bush has a greater gap. The greater gap is designed in a way that the screw can be introduced and pushed, respectively, into the interior of the raw bush without the tips of the threads of the threaded portion contacting the inner wall of the bush and especially the future narrowing locations. Introducing the screw into the raw bush may be especially realized in a way that the narrowing locations of the bush do not face the threaded portion, but instead the shank portion of the screw. The diameters of the bush are decreased by a following squeezing movement, each of the two future narrowing locations being then located at a smaller diameter such that they become active. All this may be achieved without the narrowing locations contacting the shank portion. The squeezing deformation either deforms the comparatively greater gap to attain a slot or a smaller gap at the bush.

While the first narrowing location is also active at this time, the second narrowing location becomes active only as early as it reaches the pre-mounted position at the component, meaning after the bush has been pressed into the bore of the component and after the actuation portion of the resilient element thereby has been pressed approximately in a radial inward direction such that the engagement portion engages the thread of the threaded portion. In this way, the limited axial movability between the screw and the bush in this position of the two elements of the fastener assembly is either substantially reduced or even completely eliminated. During assembly of the pre-mounted component and when handling this component during final assembly at the other associated component, impacts, vibrations and forces cannot lead to the screws exiting the bushes in a downward direction or even getting detached in an upward direction. The two narrowing locations and the frictional forces being produced thereby may also prevent the screw from rotating. However, these frictional forces can be overcome when screwing the screws into the other associated component by a tool. Depending on the design and dimension of the spring force of the resilient elements and the shape of the free ends of the resilient elements engaging into the outer thread of the threaded portion, a screw of a fastener assembly during final assembly can be pushed into the bush and into the entrance of a threaded bore of the other associated component by a respectively chosen axial force without damaging or crushing the first revolution of the thread. However, it is also possible to design the resilient elements to be comparatively stiff and to design the free ends of the resilient elements to be comparatively sharp-edged, especially in a shape similar to barbs to prevent the screw from being pushed into the bush by a pure axial force during final assembly. Instead, the screw can only exit the bush and enter the threaded bore of the associated other component in an axial direction due to a rotational movement of the screw. This rotational movement results in the screw with its threaded portion being screwed to become free from contact to the resilient elements of the second narrowing location.

In case the bush has a greater axial length than the threaded portion of the screw, there is the possibility of the bush completely covering the threaded portion. The screw may also include a centering portion. The design of the mounting surface of the respective other component for the arrangement of a seal, a washer and the like may be taken into account. It is intended that the fastener assembly located at the pre-mounted component does not negatively influence the possibility of positioning it with respect to the other associated component.

The resilient elements forming the second narrowing location may be located close to the first narrowing location as seen in an axial direction such that both narrowing locations cooperate with the end portion of the threaded portion facing the head of the screw. It is especially advantageous if the first narrowing location cooperates with the thread runout of the threaded portion facing the head of the screw and the second narrowing location cooperates with the beginning of the thread close to the thread runout facing the head of the screw such that most parts of the threaded portion never contact the two narrowing locations at any time such that damages of the thread are prevented. The elements forming the first and second narrowing location may be arranged in a spaced apart manner about the circumference of the bush in a way to partly or completely overlap in an axial direction to be capable of arranging the two narrowing locations as close as possible with respect to one another in an axial direction.

At least of the free ends of the resilient elements of the second narrowing location of the bush are distributed in a spaced apart manner axially corresponding to the pitch of the thread of the threaded portion, there is the possibility of a plurality of the free ends of the resilient elements of the second narrowing location entering the thread of the threaded portion at the same time such that the remaining relative movability of the screw with respect to the bush is limited to a distance which at least is smaller than the width of a thread. Due to a slight rotational movement after axial displacement of the screw with respect to the bush, it is even possible to attain a fixed position of the screw at the bush in the mounted fastener assembly, meaning to completely eliminate the limited axial movability of the screw with respect to the bush of the fastener assembly.

There are a number of different possibilities of designing the free ends of the resilient elements of the second narrowing location. These free ends may either be sharp-edged, barb-like or more or less rounded depending on their intended purpose. A sharp-edged design is preferred for the special cooperation of the two narrowing locations and for fixing the screw relative to the bush. This may result in the threads of the threaded portion facing the head being slightly damaged. In case such damage is to be further reduced or even completely eliminated, the free ends are designed to be rounded and the positive engagement is more or less replaced by a frictional connection.

The at least one resilient element may be connected to the bush in a first direction, and it can be free from the bush in three other directions while a gap is formed. This gap results in simplified manufacture of the bush and increased elasticity of the resilient element. The gap or free space may be especially produced by cutting free. The resilient element may be especially produced by stamping, pressing or embossing. The resilient element may have a thickness which is less than the thickness of the bush. This reduced thickness compared to the material of the bush is produced by pressing. The increased elasticity resulting from strain hardening is then advantageously used to ensure the save retaining function of the resilient element.

There are a number of different possibilities of designing the first narrowing location. Some of these possibilities are illustrated in the exemplary embodiments. However, it is also possible to use different designs of the first narrowing location. The elements of the first and/or of the second narrowing location may be designed in a way that they are a feature of the bush which can be seen from the outside and which serves to automatically determine the orientation of the bush with respect to the screw when connecting the screw and the bush, meaning when producing the fastener assembly. Especially when using an automatically conducted squeezing process, the bushes need to be fed to the screws and the elements need to be interconnected at the correct orientation. Alternatively and/or additionally, it is possible to use one or more features changing the diameter, for example imprints, beads or bevels extending over the entire circumference or at least a substantial part of the circumference of the bush to improve automatic determination of the orientation of the bushes.

The resilient elements of the second narrowing location of the bush may be arranged with respect to the first narrowing location of the bush, the axial lengths of the threaded portion and of the bush and the respective relevant dimensions of the pre-mounted component and of the associated other component such that during final assembly the beginning of the thread of the threaded portion engages a threaded bore in the respective associated component only after the threaded portion having been released from the second narrowing location. This allows for easy introduction of the threaded portion into the threaded bore in the associated component and for compensating manufacturing tolerances. However, in some cases, it is not critical if these dimensional relations are not fulfilled and the beginning of the thread of the threaded portion already enters the threaded bore in the associated component when the threaded portion still contacts the second narrowing location. Due to the fact that the second narrowing location is designed to be resilient, tolerances may be compensated and final assembly can be securely accomplished.

As mentioned before, the present invention also relates to a novel method of producing the fastener assembly. In this way, one attains an especially well-priced possibility of manufacturing the bush and thus the fastener assembly. The screw may be a screw having a usual design only including a shank portion and a threaded portion. It is not necessary to use special screws including special continuous protrusions since the two narrowing locations cooperate with the threaded portion. Preferably, the elements of the two narrowing locations are already produced in the plain condition of the strip of material, meaning a strip of material from which the raw bush is formed by rolling. It is especially advantageous if the plain strip of material cooperates with counter bearings such that the dimensions of the elements of the two narrowing locations can be produced within small tolerances and in an easy way. It is to be understood that the squeezing process is conducted with the required precision to attain the reduced diameters at the two narrowing locations of the bush when the screw and the bush are connected to each other in a captivated way.

Such a squeezing process is preferably conducted in such a relative position of the screw with respect to the raw bush in which the two narrowing locations of the shank portion face each other. The squeezing process is not negatively influenced by the insecurity of a contact with the threaded portion of the screw. Instead, after having accomplished the squeezing process in the above described relative position, the screw is pressed out off the bush until there is a first contact of the first narrowing location at the threaded portion.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
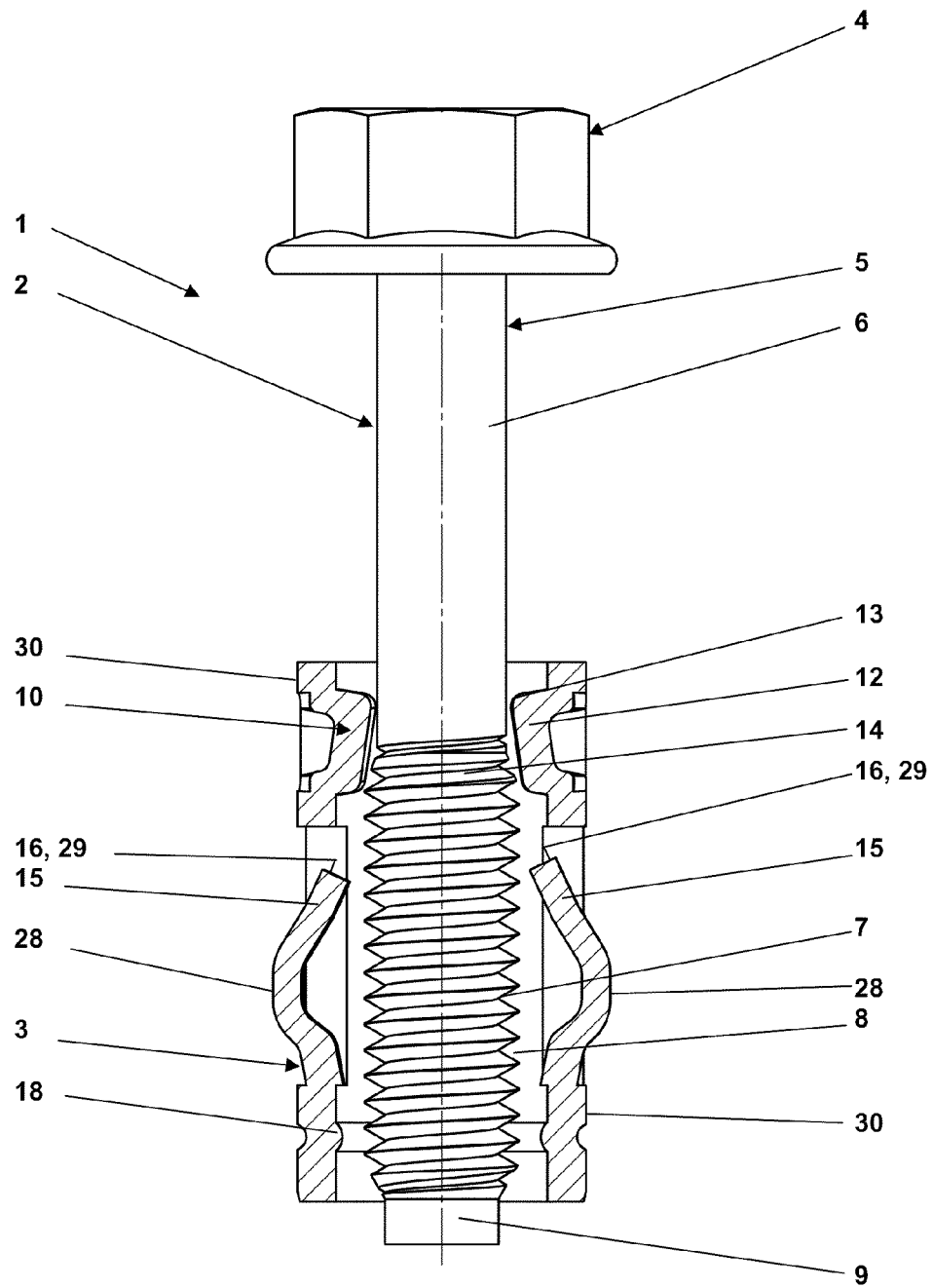
FIG. 1 is a sectional view of a first exemplary embodiment of the novel fastener assembly.

Referring now in greater detail to the drawings, FIG. 1 illustrates a first exemplary embodiment of a novel fastener assembly 1 including a screw 2 and a bush 3.

The screw 2 includes a head 4 and a shank 5. The screw 2 has a usual design. The screw is made of metal, especially steel. Especially, it is a high-tensile screw 2. The head 4 includes an engagement surface for a tool and a contact surface. The shank 5 includes a cylindrical shank portion 6 and a threaded portion 7, the outer diameter of the shank portion 6 being smaller than the outer diameter of the threaded portion 7 including a thread 8. In the illustrated example, the thread 8 is designed as a metric thread. The shank 5 may end in a centering portion 9. It is to be seen that the shank portion 6 is located at the screw 1 in a way to face the head 4, while the threaded portion 7 is arranged in a way to face away from the head 4.

The bush 3 is designed to be substantially annular. The bush 3 is made of metal, especially sheet metal. Preferably it is made of a plain section of sheet metal from which the bush 3 is then formed by rolling. To be exact, one attains a raw bush after rolling the sheet metal, the raw bush having an inner diameter still being greater than the outer diameter of the thread 8 such that during manufacture of the fastener assembly 1 the screw 2 can be introduced into the bush 3. Afterwards, a squeezing or pressing process is realized in a radial direction, this process reducing the inner diameter of the bush 3. This may be realized in the region of the shank portion 6, but it may also be realized in the relative position illustrated in FIG. 1. No matter what process is chosen, one attains a fastener assembly 1 including a screw 2 and a bush 3 being captively connected.

In contrast to the screw 2, the bush 3 has a special design. The bush 3 includes a first narrowing location 10 and a second narrowing location 11. The first narrowing location 10 includes a plurality of impressions 12 being arranged in a spaced apart manner about the circumference of the bush 3. The impressions 12 form protrusions protruding in an inward direction. For example, it is possible to arrange three or four impressions 12 which are uniformly distributed about the circumference. In the illustrated preferred exemplary embodiment, there are four impressions 12. The impressions 12 at their side protruding in an inward direction may form surface elements 13 which together form a conical element surrounding the thread runout 14 of the threaded portion 7 facing the head 4 of the screw, as this is explained in greater detail in German Patent Application No. DE 102 15 883 A1 corresponding to US Patent Application No. US 2003/0194292 A1. The impressions 12 cooperate with the thread runout 14 as a fixed pair of stops, or at least with some part of the threaded portion 7 which needs to be located at the screw 2 anyway. The size and arrangement is chosen such that in the assembled position of the fastener assembly 1 as illustrated in FIG. 1 the screw 2 cannot be pulled or pressed further out off the bush 3. In this way, the first narrowing location 10 functions as a fixed, insuperable stop.

Furthermore, there are two resilient elements 15 also being arranged to be distributed about the circumference of the bush 3. However, there may also be only one resilient element 15 or more than two resilient elements 15. The resilient elements 15 later form the second narrowing location 11 as this will be further described herein below. The resilient elements 15 may be designed to protrude from the material of the bush 3 similar to tongues. In the illustrated example, their free ends 16 are designed to be sharp-edged and barb-like, respectively. The resilient elements 15 each include an actuation portion 28 and an engagement portion 29. In the illustrated unmounted position of the fastener assembly 1, the actuation portion 28 protrudes from the outer circumference 30 of the bush 3 in a radial direction such that the engagement portion 29 does not engage the thread 8 of the threaded portion 7. This means that the resilient elements 15 are not yet active and they do not yet form the second narrowing location 11.

It is to be understood that the design of the elements of the first narrowing location 10 and of the second narrowing location 11 preferably can be realized by punching or pressing acting upon the sheet material still being in its plain configuration, meaning in a position operating with counter bearings such that the design and arrangement of the elements of the first narrowing location 10 and of the second narrowing location 11 can be realized within small tolerances.

Winding the plain metal sheet to attain the raw bush is realized in a way that one attains a gap between the ends of the metal sheet facing each other and such that the inner ends of the impressions 12 and of the resilient elements 15 are located at diameters being greater than the outer diameter of the thread 8 of the threaded portion 7. In this position, the screw 2 and the bush 3 are pushed into one another, and the bush 3 is squeezed or pressed such that the gap being located at the bush 3 is deformed to a slot 17. During this movement, the impressions 12 and the resilient elements 15 are simultaneously moved such that they have a different diameter being less than the outer diameter of the thread 8 of the threaded portion 7. In case the squeezing process is realized while the raw bush faces the shank portion 6, it is then possible to partly push the screw 2 out off the bush 3 until the impressions 12 of the first narrowing location 10 contact the thread runout 14. In this position illustrated in FIG. 1, the fastener assemblies 1 can reach their transporting position. It is to be seen that the narrowing location 10 is located rather in an upward direction, meaning close to the end of the bush 3 facing the head 4 of the screw 2 such that the bush 3 surrounds and protects the entire threaded portion 7.

Concerning the design of the first narrowing location 10 and/or the second narrowing location 11, the bush 3 may be designed such that the design of these elements at the same time is a feature of the bush 3 which serves for automatic determination of the orientation of the bush 3 in an automatically operated assembly machine for realizing captive connection of the screw 2 and the bush 3. On the other hand, it is also possible that the bush 3 includes a protrusion 18 especially protruding in an inward direction such that this feature may be used for automatic determination of the orientation of the bush 3. It is to be understood that the inner diameter of the protrusion 18 still is substantially greater than the outer diameter of the thread 8 such that the protrusion 18 does not negatively influence correct functionality of the narrowing locations 10 and 11.

The length of the bush 3 preferably is greater than the length of the threaded portion 7. It is to be seen in FIG. 1 that a part of the centering portion 9 protrudes out off the bush 3. However, the lengths may also be chosen such that this is not the case.

Figure 2:
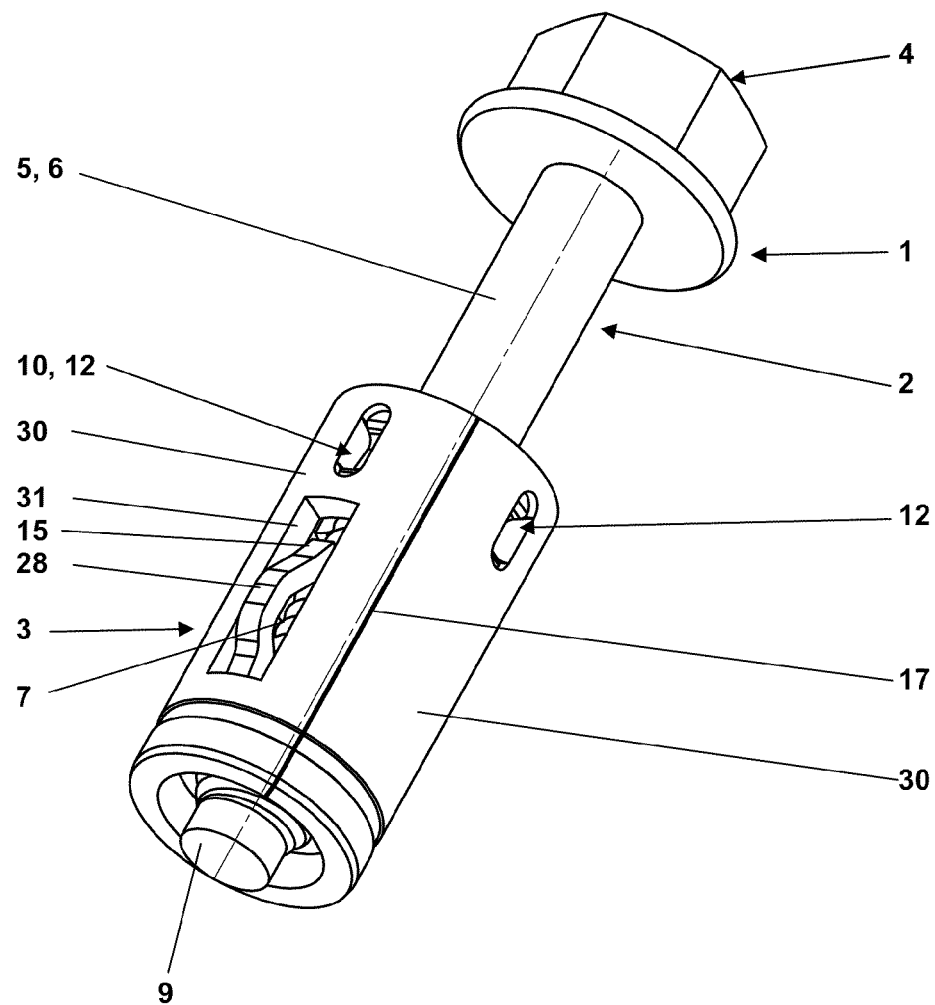
FIG. 2 is a perspective view of the first exemplary embodiment of the novel fastener assembly.

FIG. 2 illustrates the first exemplary embodiment of the novel fastener assembly in a perspective view. Especially, it is to be seen that there are four first narrowing locations 10 and two (future) second narrowing locations 11 and elements 15, respectively. Each of the elements 15 is arranged below one of the first narrowing locations 10 as seen in an axial direction. A free space 31 surrounding the element 15 at three sides is to be well seen in this figure. The bush 3 includes a slot 17 which could also be replaced by a gap 19 (see FIGS. 11, 12).

Figure 3:
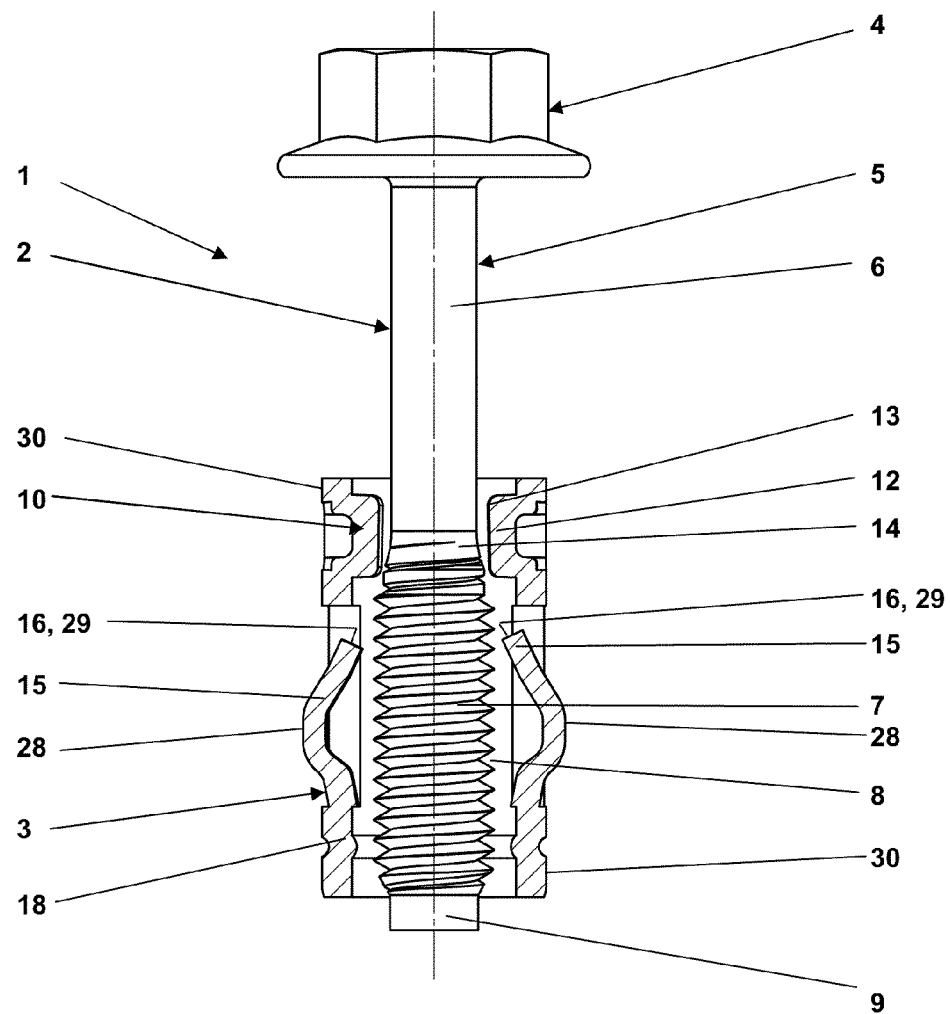
FIG. 3 is a sectional view of a second exemplary embodiment of the novel fastener assembly.

FIG. 3 illustrates a second exemplary embodiment of the novel fastener assembly 1 having many features in common with the embodiment illustrated in FIG. 1. In contrast thereto, the substantial diameter of the shank portion 6 is designed to be comparatively smaller, meaning the shank portion 6 has a reduced or retracted design. The reduction of the diameter of the shank portion 6 advantageously results in increased radial clearance or play which can be used when tightening the screws 2 by screwing during final assembly. The design of the narrowing location 10 has been slightly changed. The surface elements 13 of the impressions 12 are arranged at a substantially smaller surrounding angle or they are even arranged to extend in an axial direction. The diameter of the thread runout 14 or at least a part thereof has been reduced by rolling in coordination with the reduced surrounding angle such that there is an abrupt step-like transition to the remaining thread 8 of the threaded portion 7. In this way, one attains a pair of stops being located at the narrowing location 10 which cannot be overcome by usually occurring forces.

Figure 4:
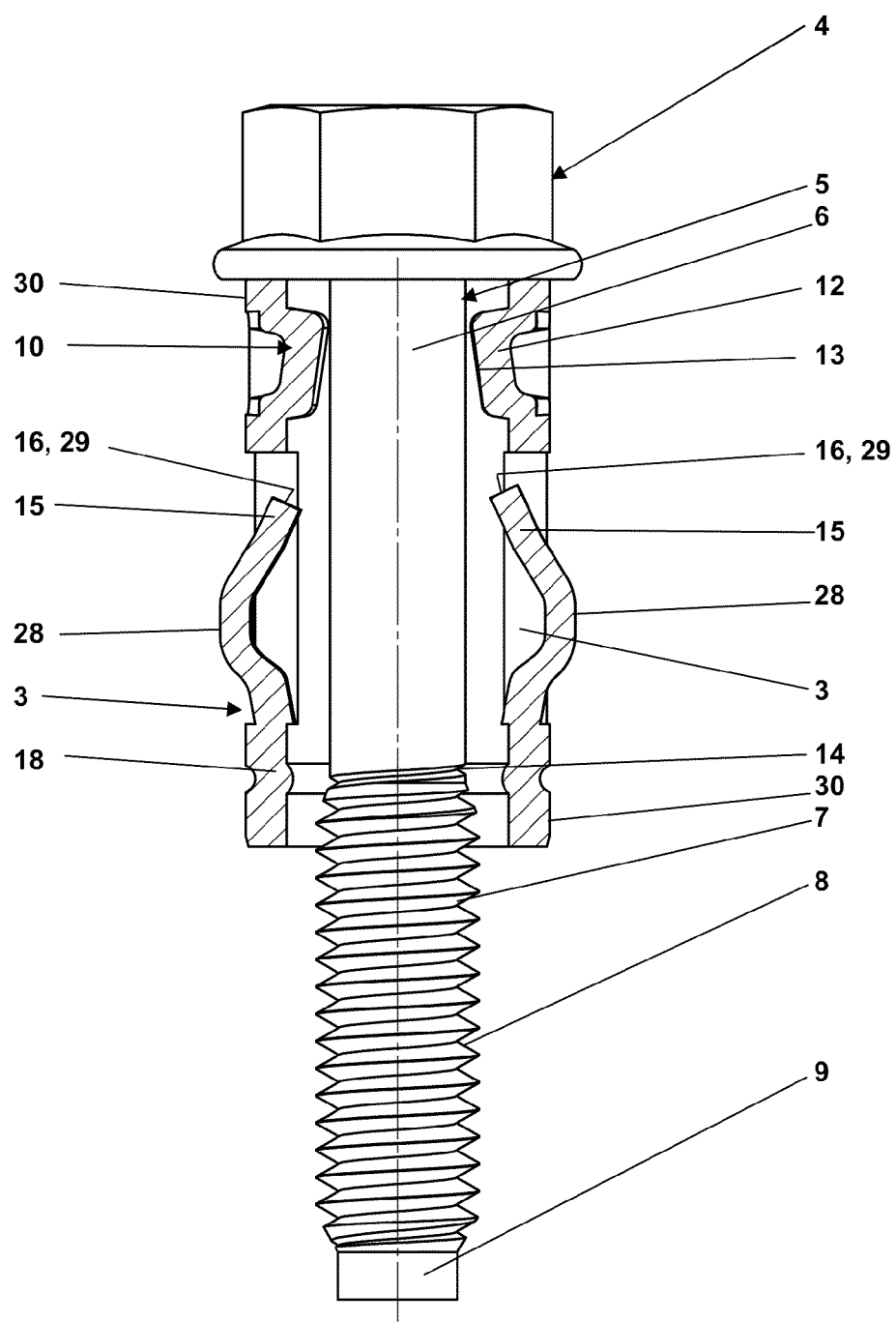
FIG. 4 is a sectional view of the first exemplary embodiment of the novel fastener assembly in which the screw is maximally pushed into the bush.
Figure 5:
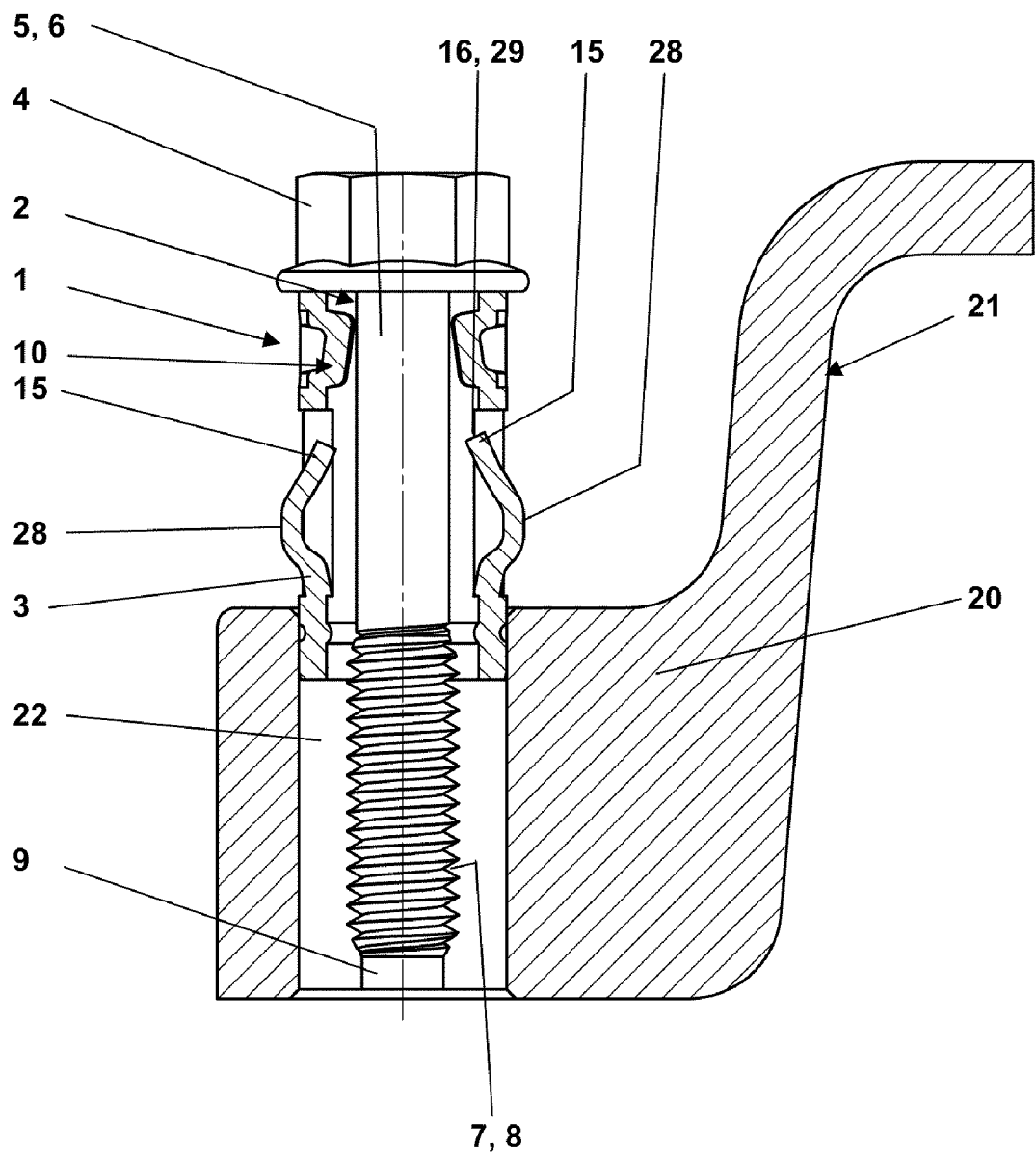
FIG. 5 is a sectional view of the first exemplary embodiment of the novel fastener assembly in a first position during pre-assembly at a component.
Figure 6:
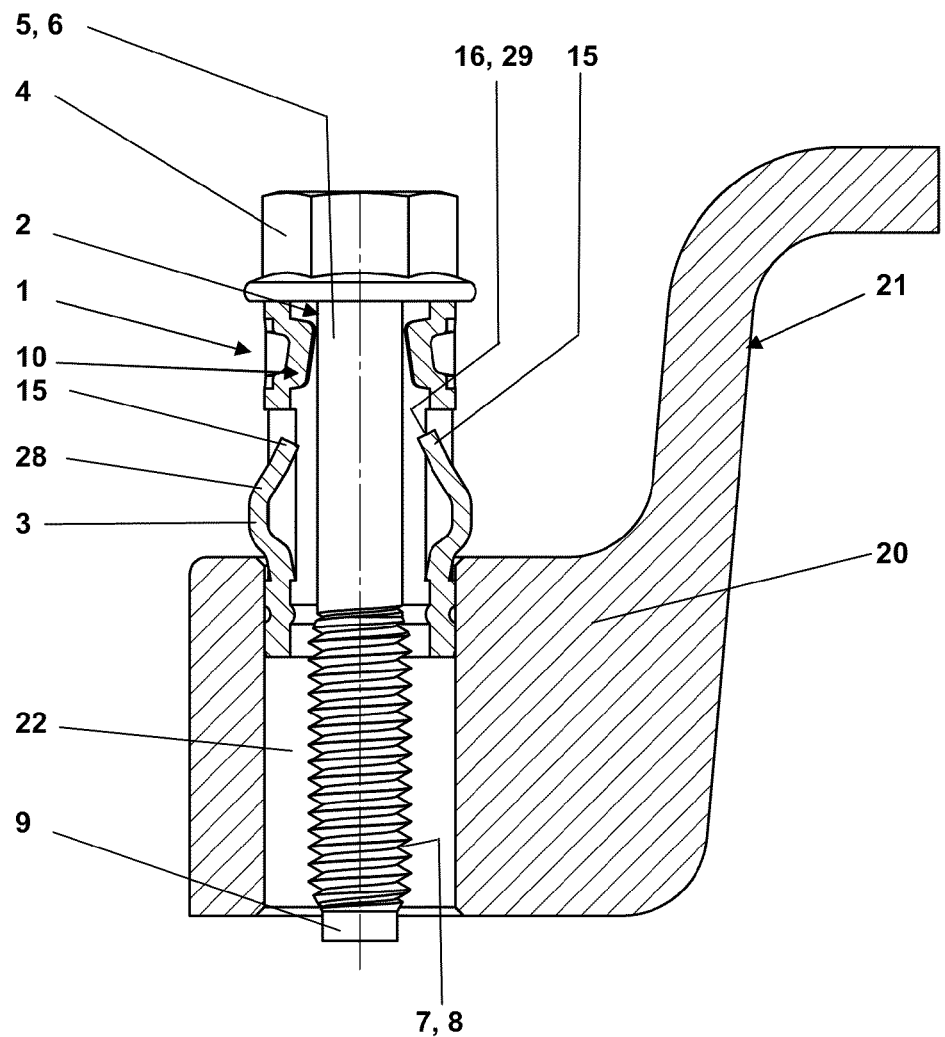
FIG. 6 is a sectional view of the first exemplary embodiment of the novel fastener assembly in a second position during pre-assembly at a component.
Figure 7:
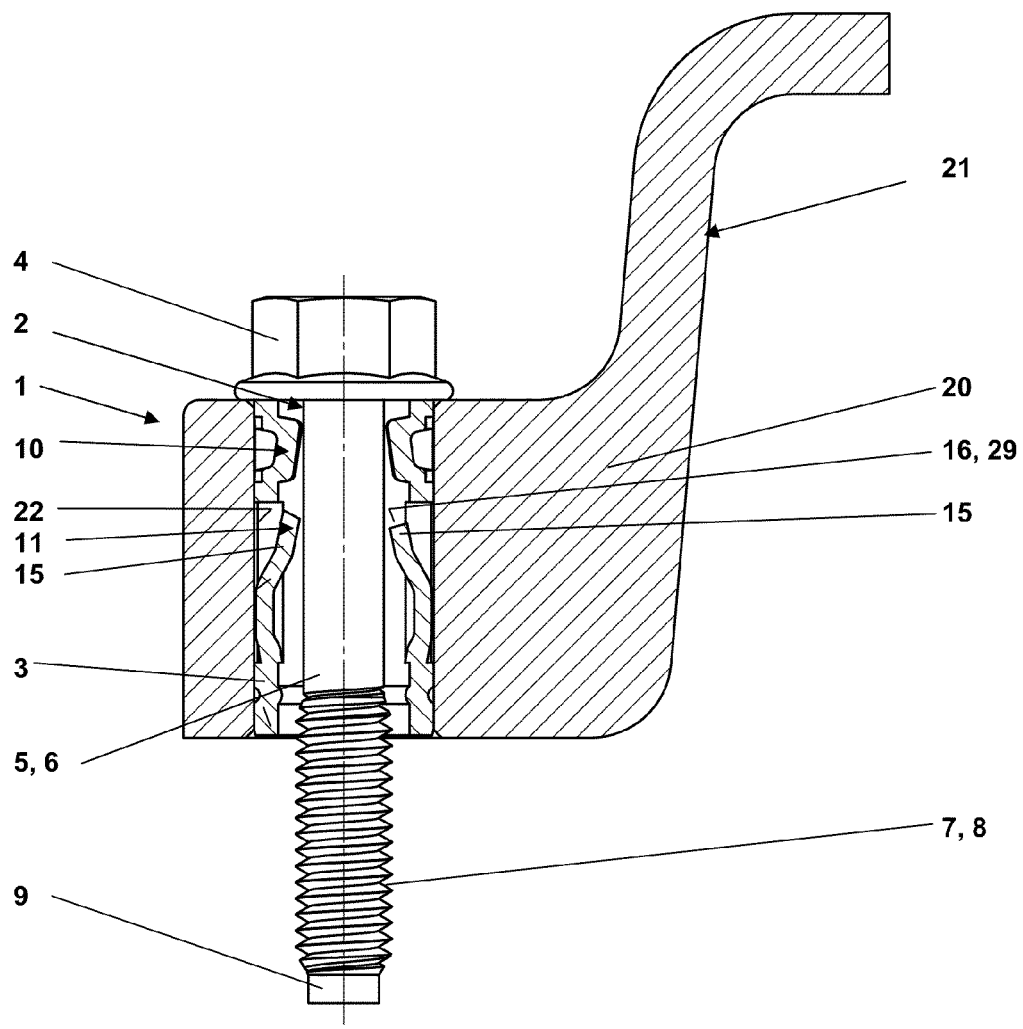
FIG. 7 is a sectional view of the first exemplary embodiment of the novel fastener assembly in a third position during pre-assembly at a component.

FIG. 4 illustrates the first exemplary embodiment of the novel fastener assembly 1 in a position in which the screw 2 has been maximally introduced into the bush 3. It is preferred to handle the fastener assembly 1 in this position before realizing pre-assembly. With the exception of the captive arrangement of the screw 2 in the bush 3, the bush 3 is freely movable with respect to the screw 2.

FIGS. 5-8 illustrate the first exemplary embodiment of the novel fastener assembly 1 in a plurality of consecutive positions during pre-assembly at a component 20. A plurality of fastener assemblies 1 is connected to the component 20 for attaining a pre-mounted unit 21. For reasons of clarity of the drawings, only one of these fastener assemblies 1 is illustrated. The bushes 3 with the fastener assemblies 1 with the captively arranged screws 2 are pressed into bores 22. Preferably, the resilient properties of the bush 3 are used to compensate for tolerances. This especially applies if the component 20 is made of plastic and the bores 22 do not have the exact shape as desired. The pre-mounted units 21 are then delivered from the manufacturer of the pre-mounted units 21 to another location, for example to the car manufacturer, where the pre-mounted units 21 are connected to other components 23 (see FIGS. 9, 10), for example bottom parts.

The resilient and elastic elements 15 now become active during pre-assembly of the fastener assembly 1 illustrated in FIGS. 5-8. During continued movement of the bush 3 into the bore 22 by pressing, the actuation portions 28 of the resilient elements 15 protruding from the outer circumference 30 get in contact to the inner surface of the bore 22 and to the material of the component 20, respectively, such that the actuation portion 28 and thus the engagement portion 29 being connected therewith are pressed radially in an inward direction. Due to this movement, the free ends 16 of the resilient elements 15 for the first time are located at a diameter which is less than the outer diameter of the thread 8 of the threaded portion 7 such that they now form the second narrowing location 11.

Figure 8:
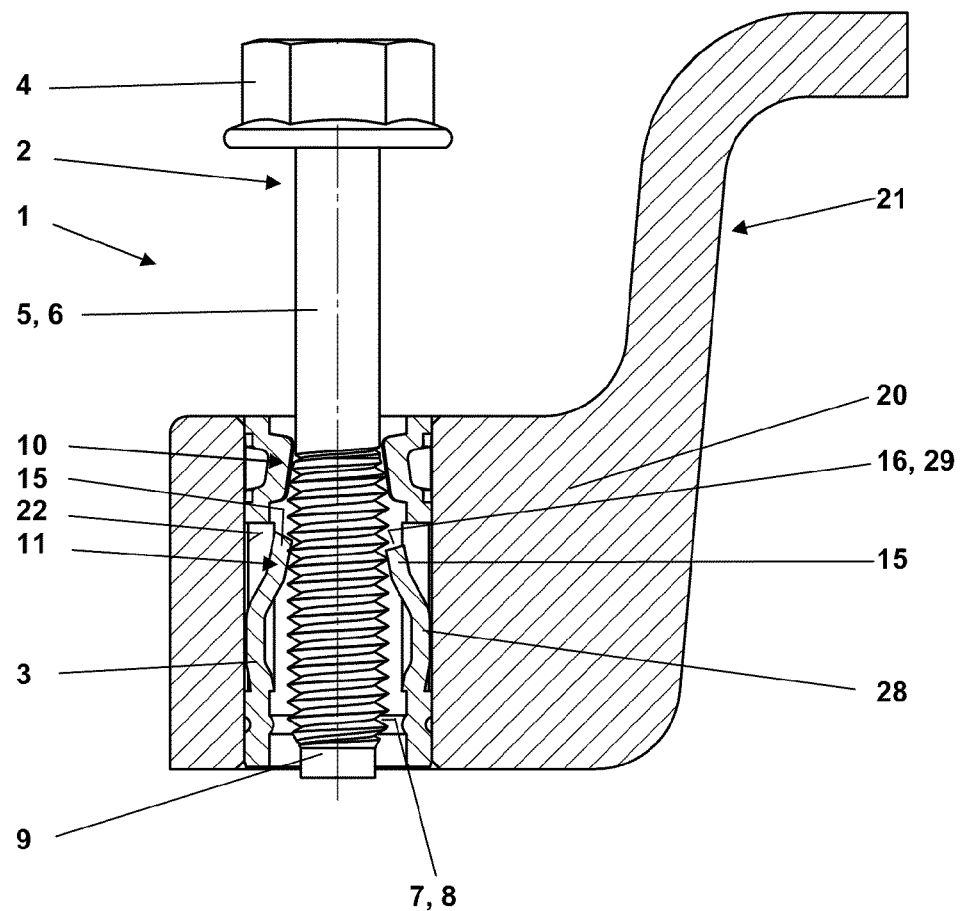
FIG. 8 is a sectional view of the first exemplary embodiment of the novel fastener assembly in a fourth position during pre-assembly at a component.

As it is to be seen in FIG. 8, the screw 2 can now be pushed or pulled out off the bush 3 in an upward direction resulting in the resilient elements 15 engaging the thread 8 of the threaded portion 7 in the sense of a frictional connection and/or a positive fit. The resilient elements 15 now also cooperate with the threaded portion 7 in a way that the respective counter elements at the screw 2 are formed by the existing threaded portion 7. In other words, it is not necessary to use a screw 2 having a special design. In this position, the screw 2 can now be located at a defined position with respect to the bush 3 for the first time, and it can only be moved with respect to the bush 3 by overcoming a respective counterforce. This position of the screw 2 is especially advantageous since the component 20 can be well transported and especially positioned with respect to another component without transportation and positioning being negatively influenced by the free end of the screw 2 protruding in a downward direction.

The resilient elements 15 with their free ends 16 being associated with the second narrowing location 11 are preferably designed, arranged and sized such that the free ends 16 and in a way corresponding to the pitch of the thread 8 such that they can enter the impression of the thread 8 of the threaded portion 7 about the circumference more or less at the same time. The design and arrangement may even be used to realize a slight relative rotational movement between the screw 2 and the bush 3 after an axial movement of the screw 2 with respect to the bush 3 during assembly of the fastener assembly 1. This serves to completely eliminate the limited axial movability and to connect the screw 2 and the bush 3 in a fixed way to attain a fixed fastener assembly 1.

Figure 9:
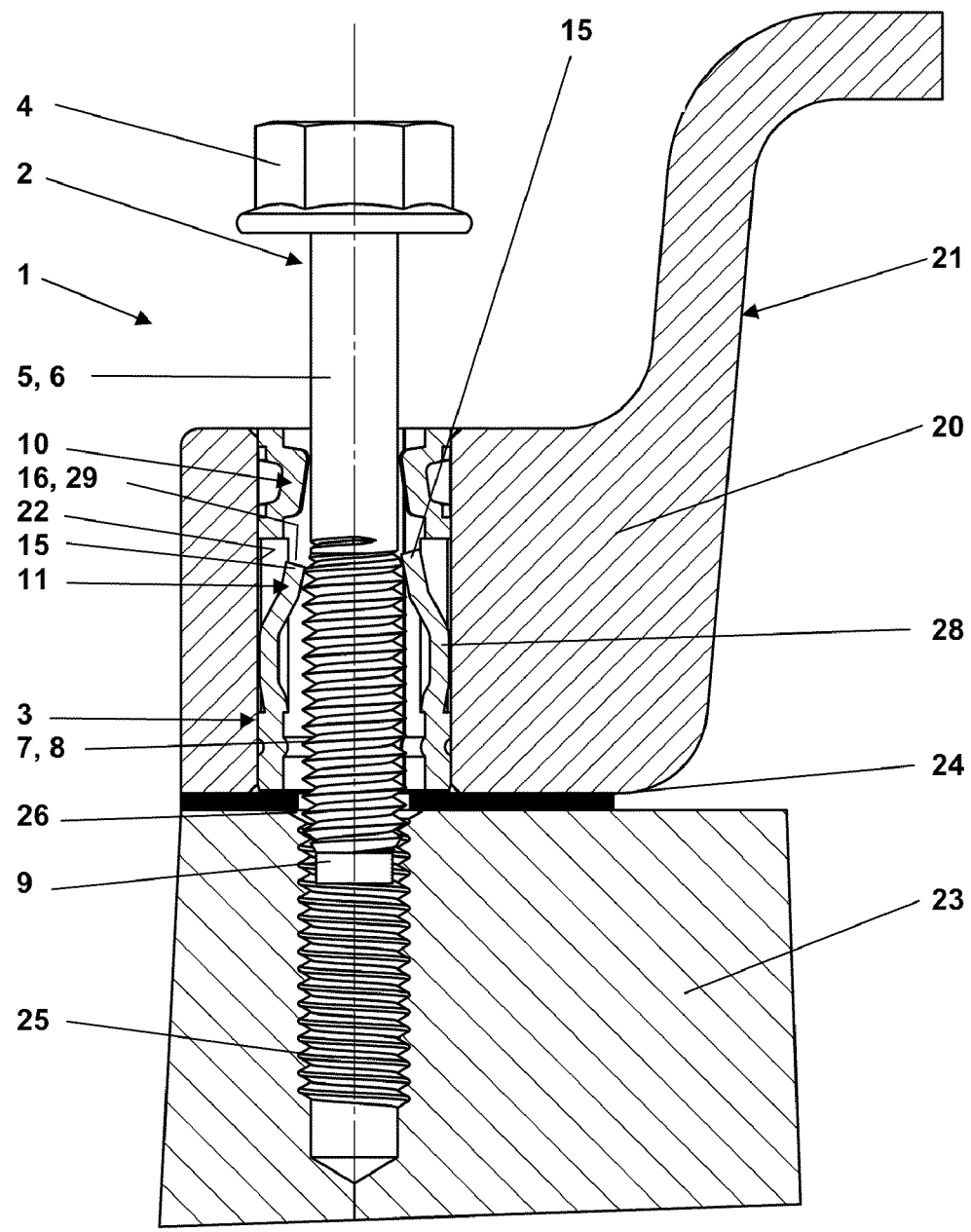
FIG. 9 is a sectional view of the first exemplary embodiment of the novel fastener assembly during final assembly.

The following final assembly at a second component 23 is to be best seen in FIG. 9. In the illustrated example, a seal 24 is arranged between the components 20, 23. Starting from the position illustrated in FIG. 8, continued assembly may be realized in a way that the screw 2 of each fastener assembly 1 is further pressed down by a pure axial pushing movement resulting in the centering portion 9 entering the threaded bore 25 without the threads of the threaded portion 7 getting in contact to the inner threads being located in the threaded bores 25. This is possible since the rounded free ends 16 of the resilient elements 15 allow for such an axial displacement. It is to be understood that such a pure axial movement is not possible when designing the free ends 16 as sharp-edged barbs as illustrated in FIG. 1. Instead, in this case the axial movement of the screw 2 has to be replaced by a rotational movement, meaning a screwing movement of the screw 2 out off the bush 3 in a downward direction while entering the threads of the threaded bore 25. This movement is realized by a tool.

Figure 10:
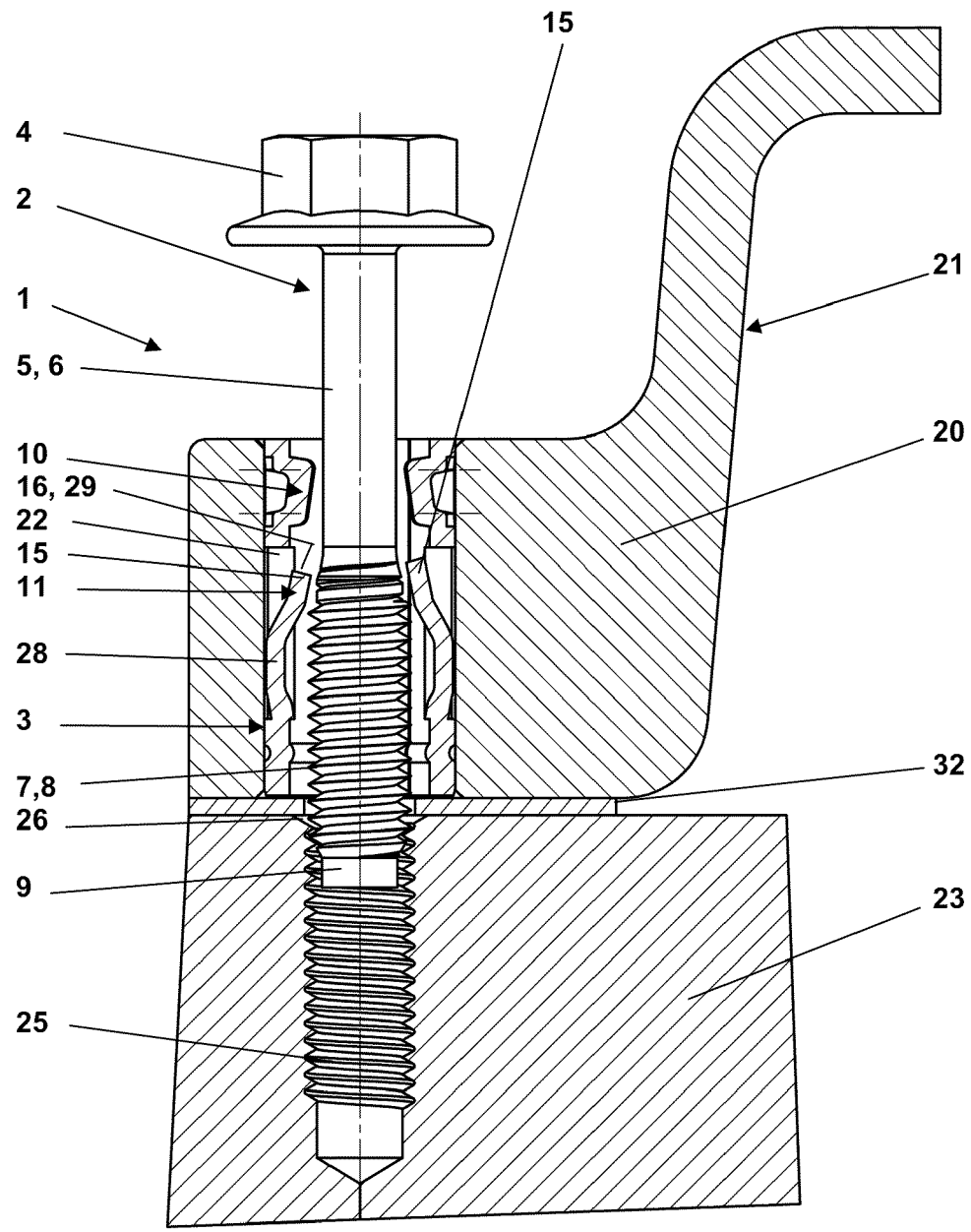
FIG. 10 is a sectional view of the second exemplary embodiment of the novel fastener assembly during final assembly.

FIG. 10 illustrates the second exemplary embodiment of the novel fastener assembly 1 during final assembly. In this example, a washer 32 is located between the components 20, 23.

It is also to be seen in the drawings that the inwardly protruding protrusion 18 forming a channel on the outside of the bush 3 cannot only be used for determination of the orientation when producing the fastener assembly 1, but that the bore 22 includes a continuous protrusion 27 in axial orientation to the continuous channel of the protrusion 18 such that the axial position of the bush 3 and of the fastener assembly 1 in the component 20 is determined. In connection with the illustration and arrangement of the two narrowing locations 10 and 11 with respect to one another, it is to be seen that the design and arrangement may be chosen such that the order of the threaded portion 7 of the second narrowing location 11 can be determined during final assembly. For example, the design and arrangement may be chosen such that the threaded portion 7 is detached from the second narrowing location 11 before the first thread of the thread 8 contacts the thread in the threaded bore 25 of the other component 23. In case the resilient elements 15 includes rounded free ends 16, it is also possible to realize an overlapping situation between the threaded portion 7 exiting the second narrowing location 11 and entering the thread of the threaded bore 25.

Figure 11:
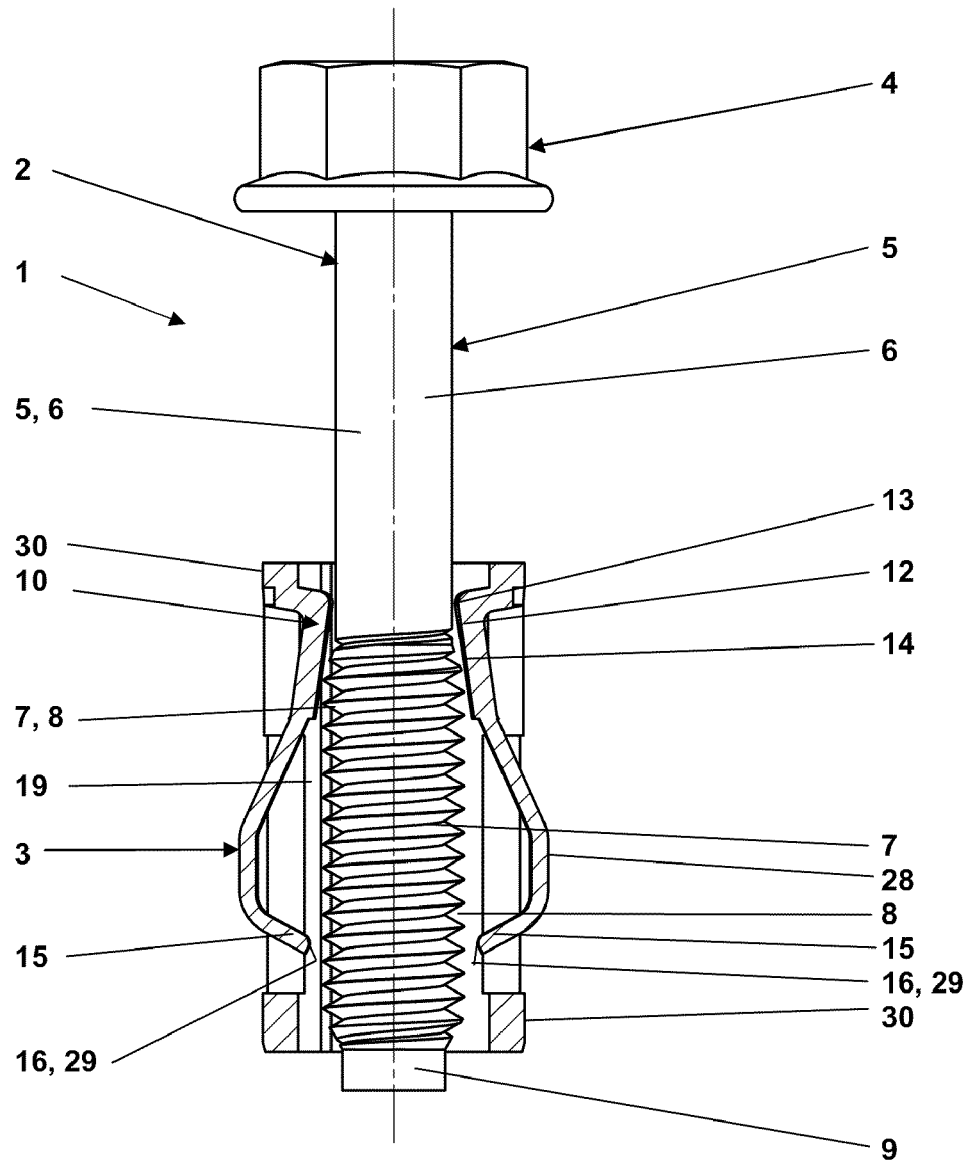
FIG. 11 is a sectional view of a third exemplary embodiment of the novel fastener assembly.
Figure 12:
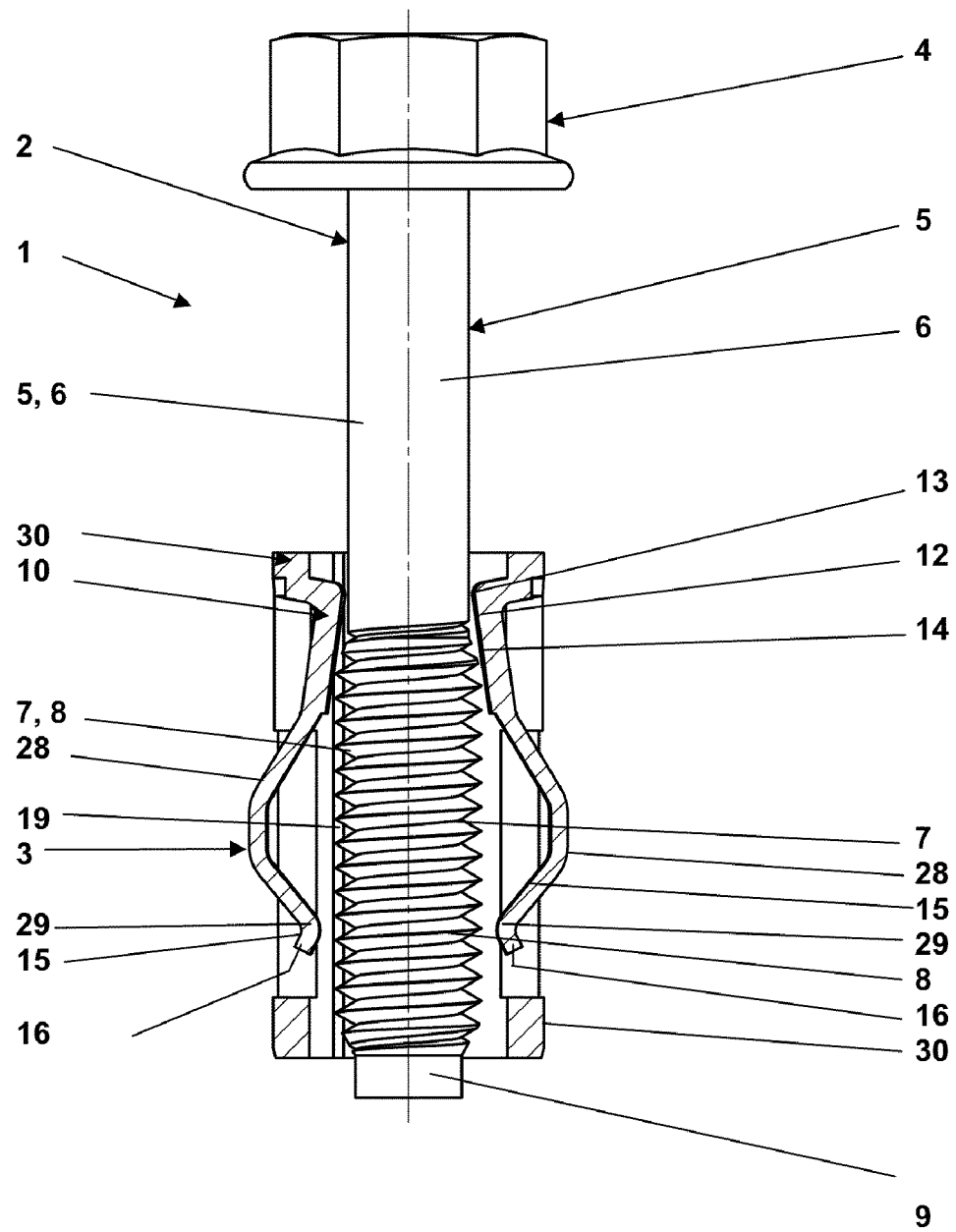
FIG. 12 is a sectional view of a fourth exemplary embodiment of the novel fastener assembly.

FIGS. 11 and 12 illustrate further exemplary embodiments of the novel fastener assembly 1 with a screw 2 according to FIG. 1 and a bush 3 having a different design. The elements of the two narrowing locations 10 and 11 are combined. The impressions 12 are simultaneously designed as the resilient elements 15. At one of their ends, they include a non-resilient portion forming the surface elements 13, and in their free end portion, they form the free ends 16 of the resilient elements 15. It is to be understood that the coordination of the elements 13 and 15 has to be carefully chosen. The free ends 16 are not arranged corresponding to the pitch of the thread, but instead to be located on one common circumferential line and in one common circumferential plane, respectively, a seen in an axial direction. The free ends 16 of the resilient elements 15 may be designed to have inclined surfaces being effective in different ways as illustrated such that snapping of the elements 15 over the tips of the threads of the thread 8 is only possible in one direction.

Figure 13:
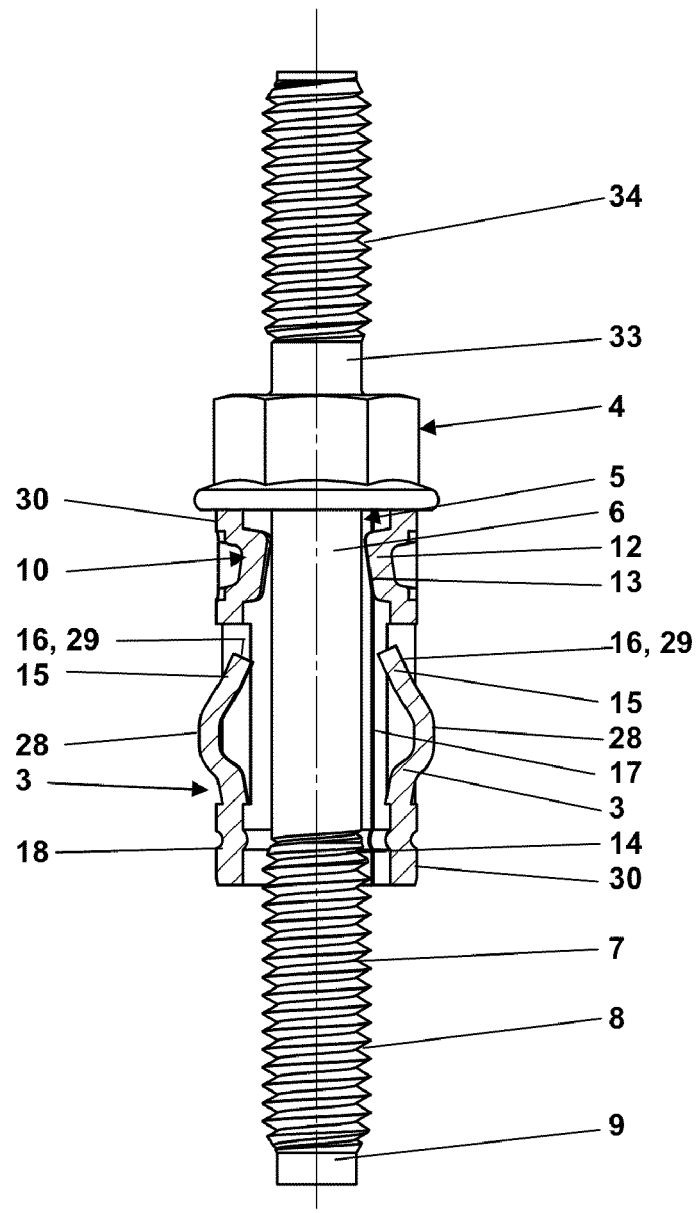
FIG. 13 is a sectional view of a fifth exemplary embodiment of the novel fastener assembly.
Figure 14:
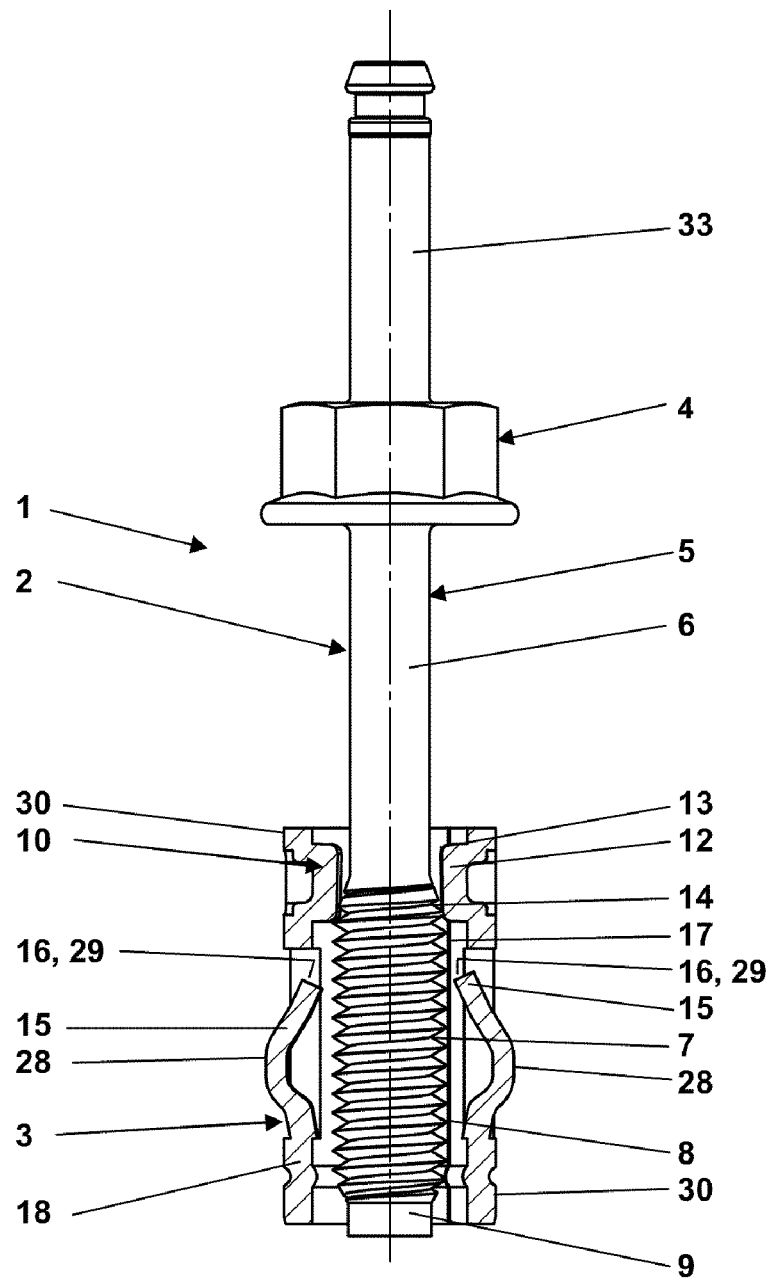
FIG. 14 is a sectional view of a sixth exemplary embodiment of the novel fastener assembly.

FIGS. 13 and 14 illustrate additional exemplary embodiments of the novel fastener assembly 1 with the screw 2 having a different design. The screw 2 includes another shank portion 33 being located above the head 4. In FIG. 13, it includes another threaded portion 34. In case of such a screw 2 and also in case of all other embodiments of the fastener assembly 1, it is possible to replace the head 4 of the screw 2 by another portion having an engagement surface for a tool serving for actuation of the screw 2. In this sense, the term "head" of the screw in this application is to be interpreted functionally and in a wide sense. Furthermore, the sectional views of FIGS. 13 and 14 are chosen such that the slot 17 is to be seen.

Many variations and modifications may be made to the preferred embodiments of the invention without departing substantially from the spirit and principles of the invention. All such modifications and variations are intended to be included herein within the scope of the present invention, as defined by the following claims.

I claim:

1. A fastener assembly, comprising:
a screw,
said screw including a head, a shank portion and a threaded portion including a thread,
said shank portion being arranged to face said head and said threaded portion being arranged to face away from said head,
said shank portion having a diameter and said thread having an outer diameter, the diameter of said shank portion being smaller than the outer diameter of said thread; and
a bush,
said bush having an outer circumference,
said bush including a first narrowing location, said first narrowing location having a diameter being smaller than the outer diameter of said thread,
said bush being captively connected to said screw by said first narrowing location,
said bush including at least one resilient element having an actuation portion and an engagement portion,
said actuation portion in an unmounted position of said fastener assembly extending from the outer circumference of said bush in a radial direction in a way that said engagement portion does not engage said thread of said threaded portion, and
said actuation portion being designed and arranged to be pressed in an inward direction in a pre-mounted position of said fastener assembly in a bore of a component such that said engagement portion engages said thread of said threaded portion.

2. The fastener assembly of claim 1, wherein said actuation portion of said resilient element in the unmounted position of said fastener assembly protrudes from the outer circumference of said bush in a radial outward direction and in the pre-mounted position of said fastener assembly in a bore of a component contacts an inner surface of the bore such that said actuation portion and said engagement portion are pressed in a radial inward direction to engage said thread of said threaded portion.

3. The fastener assembly of claim 1, wherein said resilient element is designed and arranged to form a second narrowing location in the pre-mounted position in which said resilient element engages said thread of said threaded portion.

4. The fastener assembly of claim 2, wherein said resilient element is designed and arranged to form a second narrowing location in the pre-mounted position in which said resilient element engages said thread of said threaded portion.

5. The fastener assembly of claim 1, wherein said bush includes a slot continuously extending in an axial direction.

6. The fastener assembly of claim 1, wherein said bush includes a gap continuously extending in an axial direction.

7. The fastener assembly of claim 1, further comprising a plurality of resilient elements, each of said resilient elements having a free end.

8. The fastener assembly of claim 7, wherein said thread of said threaded portion of said screw has a pitch, said free ends of said resilient elements being located at said bush in a distributed manner corresponding to the pitch of said thread.

9. The fastener assembly of claim 1, wherein said resilient element is connected to said bush in a first direction and is not connected to said bush in three other directions such that a free space is formed.

10. The fastener assembly of claim 1, wherein said resilient element has a thickness which is less than a thickness of said bush.

11. A pre-mounted unit, comprising:
a component including a bore; and
a fastener assembly, said fastener assembly including:
  a screw,
    said screw including a head, a shank portion and a threaded portion including a thread,
    said shank portion being arranged to face said head and said threaded portion being arranged to face away from said head,
    said shank portion having a diameter and said thread having an outer diameter, the diameter of said shank portion being smaller than the outer diameter of said thread; and
  a bush,
    said bush having an outer circumference,
    said bush including a first narrowing location, said first narrowing location having a diameter being smaller than the outer diameter of said thread,
    said bush being captively connected to said screw by said first narrowing location,
    said bush including at least one resilient element having an actuation portion and an engagement portion,
    said actuation portion in an unmounted position of said fastener assembly extending from the outer circumference of said bush in a radial direction in a way that said engagement portion does not engage said thread of said threaded portion, and
    said actuation portion being designed and arranged to be pressed in an inward direction in a pre-mounted position of said fastener assembly in said bore of said component such that said engagement portion engages said thread of said threaded portion.

12. The pre-mounted unit of claim 11, wherein said actuation portion of said resilient element in the unmounted position of said fastener assembly protrudes from the outer circumference of said bush in a radial outward direction and in the pre-mounted position of said fastener assembly in said bore of said component contacts an inner surface of the bore such that said actuation portion and said engagement portion are pressed in a radial inward direction to engage said thread of said threaded portion.

13. The pre-mounted unit of claim 12, wherein said resilient element is designed and arranged to form a second narrowing location in the pre-mounted position in which said resilient element engages said thread of said threaded portion.

14. A method of producing a fastener assembly including a screw and a bush, the screw including a threaded portion including a thread having an outer diameter, the bush being captively connected to the screw, said method comprising the steps of:
  forming at least one impression on a plain strip of sheet material to form a first narrowing location in a rolled condition of the strip of sheet material;
  forming at least one resilient element to form a future second narrowing location in a rolled condition of the strip of sheet material, the resilient element having an actuation portion and an engagement portion;
  rolling the plain strip of sheet material to form a raw bush, the bush having an outer circumference;
  introducing the screw into an interior of the raw bush in an axial direction; and
  deforming the raw bush by a radial inwardly directed squeezing process to attain the bush in a way that
    the first narrowing location has a smaller diameter than the outer diameter of the thread such that the screw and the bush are captively connected,
    the actuation portion in an unmounted position of the fastener assembly extends from the outer circumference of the bush in a radial direction in a way that the engagement portion does not engage the thread of the threaded portion, and
    the actuation portion is designed and arranged to be pressed in an inward direction in a pre-mounted position of the fastener assembly in a bore of a component such that the engagement portion engages the thread of the threaded portion.

15. The method of claim 14, wherein
in the step of rolling, the plain strip of sheet material is rolled in a way that a gap having a first diameter is formed, and
in the step of deforming, the diameter of the gap is reduced to attain a second smaller diameter.

* * * * *